United States Patent
Eberspach

(10) Patent No.: US 7,060,936 B2
(45) Date of Patent: Jun. 13, 2006

(54) HEATING SYSTEM FOR A VEHICLE

(75) Inventor: Günter Eberspach, Wolfschlugen (DE)

(73) Assignee: J. Eberspächer GmbH & Co. KG, Esslingen (DE)

( * ) Notice: Subject to any disclaimer, the term of this patent is extended or adjusted under 35 U.S.C. 154(b) by 0 days.

(21) Appl. No.: 11/028,797

(22) Filed: Jan. 4, 2005

(65) Prior Publication Data

US 2005/0173550 A1   Aug. 11, 2005

(30) Foreign Application Priority Data

Jan. 8, 2004   (DE) .................... 10 2004 001 355

(51) Int. Cl.
*B60L 1/02*   (2006.01)

(52) U.S. Cl. ................ 219/202; 219/270; 219/263; 219/205; 219/207; 237/12; 237/12.3 C; 237/12.3 R

(58) Field of Classification Search ............ 219/202, 219/270, 263, 205–207; 232/12, 12.3 C, 232/12.3 R, 2 R
See application file for complete search history.

(56) References Cited

U.S. PATENT DOCUMENTS 4,411,385 A * 10/1983 Lamkewitz ............... 237/2 A
6,726,114 B1 * 4/2004 Blaschke et al. ........... 237/2 R

FOREIGN PATENT DOCUMENTS

DE          30 31 410 C2    3/1982
DE          101 30 638 A1   1/2003

* cited by examiner

*Primary Examiner*—Shawntina Fuqua
(74) *Attorney, Agent, or Firm*—McGlew & Tuttle, P.C.

(57) ABSTRACT

A heating system for a vehicle includes a heater (12) with a first electric heating device (24), which can be operated to ignite an air/fuel mixture present in a combustion chamber (16), and with a second electric heating device (22) for supporting the evaporation of the fuel. An actuating device (26) is provided for putting the heater (12) into operation after a start command has been generated. A first start command generating device (30, 36, 26) can be actuated by a user to generate a start command and a second start command generating device (32, 38, 26) generates a start command according to an operating program. The actuating device (26) operates the second heating device (22) at a lower heat output after a start command has been generated by means of the second start command generating device (32,38, 26).

16 Claims, 1 Drawing Sheet

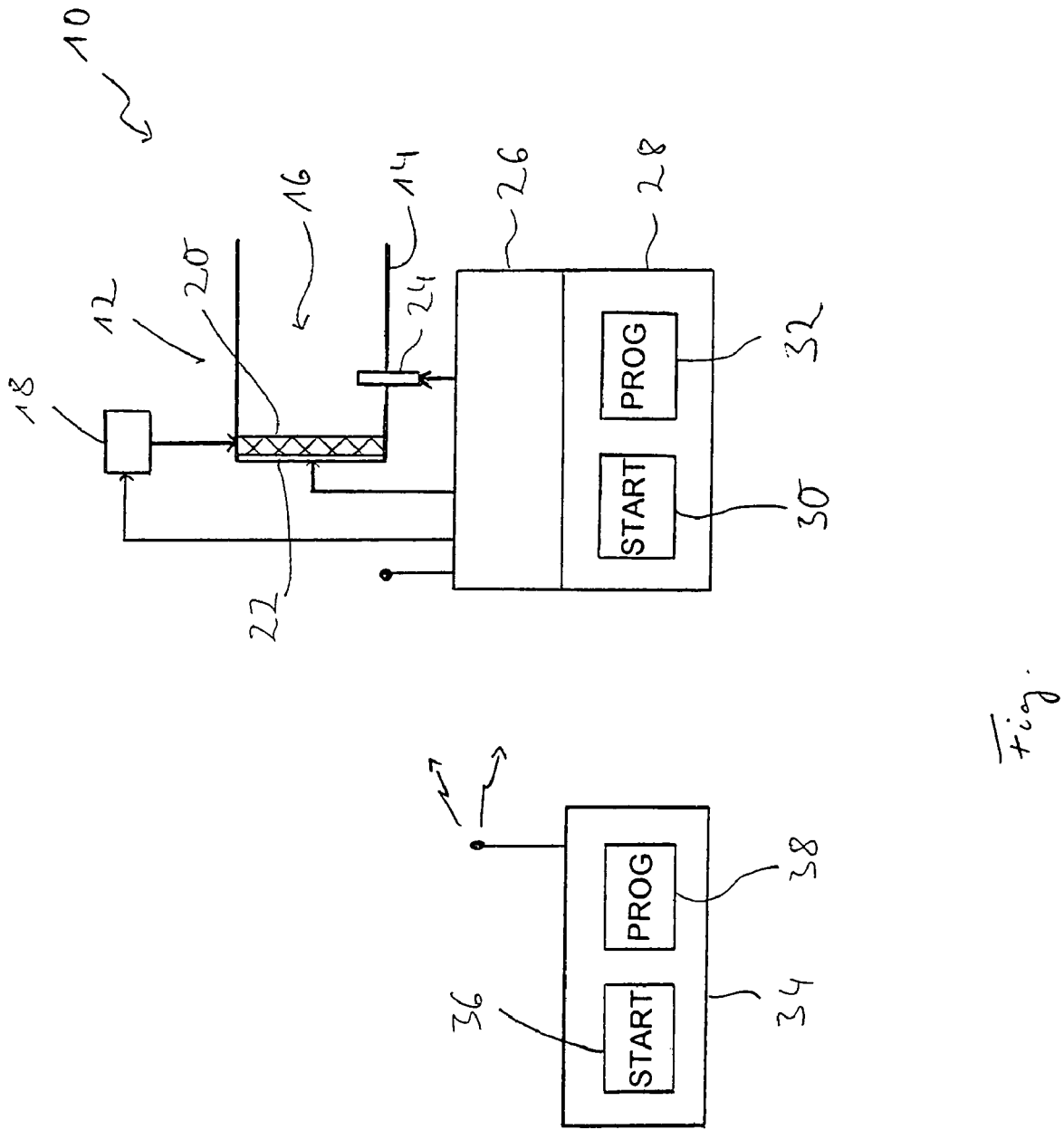

HEATING SYSTEM FOR A VEHICLE

CROSS REFERENCE TO RELATED APPLICATIONS

This application claims the benefit of priority under 35 U.S.C. § 119 of German Application 10 2004 001 355.1 filed Jan. 8, 2004, the entire contents of which are incorporated herein by reference.

FIELD OF THE INVENTION

The present invention pertains to a heating system for a vehicle, comprising a heater with a first electric heating device, which can be operated to ignite an air/fuel mixture present in a combustion chamber and with a second electric heating device, which can be operated to support the evaporation of the fuel into the combustion chamber; an actuating device for the heater, which puts the heater into operation after a start command has been generated; a first start command generating device, which can be actuated by a user to generate a start command, as well as a second start command generating device, which generates a start command according to an operating program.

BACKGROUND OF THE INVENTION

DE 101 30 638 A1 discloses a heating system with a so-called vaporizing burner. A porous evaporator medium is arranged in this vaporizing burner in the bottom area of a combustion chamber, and this evaporator medium distributes the liquid fuel fed into it under capillary delivery action and evaporates the fuel into the combustion chamber on its top side, which is freely exposed toward a combustion chamber. To support this evaporation, a heating means, which can be operated electrically, is associated with the evaporator medium, so that increased evaporation of fuel can be achieved by raising the temperature in the area of this porous evaporator medium. Furthermore, another electric heating means in the form of a glow type ignition pin is present, which can generate very high temperatures locally and is thus used to ignite the fuel/air mixture generated in the combustion chamber and thus to start the combustion.

The heat output, with which the electric heating device associated with the porous evaporator medium is operated, can be set in this prior-art heating system as a function of various conditions. Thus, it is known that a higher heat output can be made available at lower ambient temperatures in order to thus intensify the evaporation of the fuel. Furthermore, the heating output of this heating device can be varied depending on whether such a heater is operated as a parking heater or as an auxiliary heater, because a longer time until the start of the combustion is acceptable in case of operation as a parking heater, whereas high temperatures shall be generated as quickly as possible in case of operation as an auxiliary heater.

SUMMARY OF THE INVENTION

The object of the present invention is to design such a heating system such that it is adapted to the operating conditions in terms of its starting behavior in an improved manner.

This object is accomplished according to the present invention by a heating system for a vehicle, comprising a heater with a first electric heating device, which can be operated to ignite an air/fuel mixture present in a combustion chamber, and with a second electric heating device, which can be operated to support the evaporation of the fuel into the combustion chamber; an actuating device for the heater, which puts the heater into operation after a start command has been generated; a first start command generating device, which can be actuated by a user to generate a start command; a second start command generating device, which generates a start command according to an operating program, wherein the actuating device is designed to operate the second electric heating device with a lower heat output after a start command has been generated by means of the second start command generating device than after the generation of a start command by means of the first start command generating device.

Consequently, a differentiation is made in the heating system according to the present invention during the start phase according to the manner in which a start command has been generated. If the start command has been generated by the user himself, i.e., by actuating the first start command generating device, this indicates that the user is, e.g., already in the vehicle or he will put the vehicle into operation. This in turn means, however, that it is important to be able to carry out the heating operation very rapidly, which makes necessary a very short start time. Consequently, the second electric heating device is operated with a higher heat output in this state, which contributes to a markedly shorter start phase of the heater due to intensified evaporation of the fuel, even though it represents a higher load on the onboard power supply system. If, on the other hand, the start command is generated according to a program, this indicates that the putting into use of the vehicle is not imminent, but only a preheating operation defined by a program is to take place. A longer start phase is acceptable for the heater under these operating conditions, because a sufficient heating period will generally follow thereafter. The load on the onboard power supply system can thus be markedly reduced above all in the parking heating mode, i.e., in a heating mode that will take place at low ambient temperatures.

Provisions may be made, for example, for defining at least one start time in the operating program.

According to another advantageous aspect, the system according to the present invention may be designed such that the operating program can be entered by a user, and that when a duration between the entry of an operating program by a user and the start time defined in the operating program is shorter than a predetermined minimum time, the control device operates the second electric heating device with a higher heat output after the generation of the start command by means of the second start command generating device than when the duration is not shorter than the minimum time.

The fact is taken into account here that even when the start command is generated by an operating program that was defined or entered by a user before, it may happen that a driver has performed this program after having entered the vehicle, in such a way that operation of the heater already becomes necessary relatively shortly after the programming. An excessively long start phase of the heater is not acceptable even under these conditions, because it can be assumed that the driver will next put the vehicle into operation.

For example, provisions may be made in this case for the control device to operate the second electric heating device with maximum heat output when the duration is shorter than the minimum time after the generation of the start command by means of the second start command generating device in the normal case.

To make it possible to achieve the greatest possible reduction of the load on the onboard power supply system during the generation of the start command by means of the second start command generating device, it is proposed, furthermore, that the control device does not put the second electric heating device into operation after the generation of the start command by means of the second start command generating device.

According to another aspect, the present invention pertains to a process for operating a heating system in a vehicle, which said heating system comprises a heater with a first electric heating device, which can be operated to ignite an air/fuel mixture present in a combustion chamber, and with a second electric heating device, which can be operated to support the evaporation of the fuel into the combustion chamber; a first start command generating device, which can be actuated by a user to generate a start command; a second start command generating device, which generates a start command according to an operating program, in which process the second electric heating device is operated with a higher heat output after the generation of a start command by means of the first start command generating device than after the generation of a start command by means of the second start command generating device.

The present invention will be described in detail below with reference to the attached figure.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

The only FIGURE is a schematic view of a heating system according to the present invention.

DESCRIPTION OF THE PREFERRED EMBODIMENT

Referring to the drawings in particular, the heating system is designated in general by 10 in the FIGURE. As an essential system component, this heating system 10 comprises a heater 12 shown schematically. The heater 12 has, in a combustion chamber housing 14, a combustion chamber 16, in which a mixture of fuel and combustion air can be ignited and burned. The fuel, which occurs, in general, in the liquid form, is sent to the heater 12 via a fuel feed means 18. A porous evaporator medium 20 is provided, for example, at a bottom area of the combustion chamber housing 14. This evaporator medium, constructed of a braiding, a knitted fabric, a foam-like material or the like, takes up the fuel fed in by the fuel feed means 18 and distributes same by capillary action. The fuel will then evaporate on the top side of the porous evaporator medium, which said top side faces the combustion chamber 16, in the direction of the combustion chamber 16.

An evaporation heating means 22 is associated with the porous evaporator medium 20. This heating means, which comprises a heating coil or the like and can be operated electrically, is used to beat the porous evaporator medium and consequently also the liquid fuel contained therein and thus to ensure the sufficient evaporation of the fuel during the start phase of the heater 12 especially at a low ambient temperature.

Besides a combustion air feed means, which is not shown in greater detail, the heater 12 has another heating means 24, which can be operated electrically. This heating means 24, designed, for example, in the form of an ignition heating device with a glow type ignition pin, and is used to ignite the mixture of combustion air and fuel vapor collecting in the combustion chamber 16 to start the combustion. This heating means 24 generates very high temperatures locally for this purpose, which are sufficient to ignite the mixture and thus to start the combustion.

The various system areas to be activated and deactivated by a corresponding actuation, i.e., especially the two heating means 22, 24 and the fuel supply means, are actuated by a control device generally designated by 26. This generates the various control commands and ensures that suitable voltages are applied to the different, electrically excitable system components.

An operating unit 28 is associated with the control device 26. This operating unit 28, which is preferably a stationary unit installed in a vehicle, is used by a user to preset a desired operation of the heater 12. Thus, the operating unit 28 may be, for example, a start button or switch 30, whose activation or pressing has the consequence that a first type start command is generated for the heater 12 and the different system areas mentioned are then correspondingly activated by the control device 26 as needed. Furthermore, a programming button 32 is provided in the operating unit 28. An actuating program, in which, for example, a certain point in time is set at which the heater 12 is to be put into operation and in which a duration over which the heater 12 shall then be in operation after the preset point in time, can be generated by the programming button or optionally by a plurality of programming buttons, for example, also a numeric keypad. Ha fixed start time, i.e., for example, a certain time of day, is preset, optionally also associated with certain days of the week, the start time now defined in an actuating program is compared with the current time, and if agreement is detected, a second type start command is in turn generated, which will then again have the consequence in the control device 26 of leading to the corresponding actuation of the different system areas.

Furthermore, a mobile operating unit 34, which likewise has a start button 36 and one or more programming buttons 38, can be recognized in the FIGURE. Provisions may be made, for example, for the functionality of the mobile operating unit 34 to correspond basically to the functionality of the operating unit 28 which is stationarily installed in the vehicle, so that the heater 12 can also be put directly into operation from this mobile operating unit 34 by pressing the start button 36, or a program can be defined, which will in turn define, for example, a switch-on time or an operating time. The mobile operating unit 34 transmits the data to the control device 26 via radio connection, so that the control device 26 can recognize, for example, the actuation of the start button 36 or it can receive or generate a corresponding start command, or it can receive a corresponding program on actuation of the programming button 38 and store same in an overwritable memory.

As was mentioned above, the heater 12 is put into operation, in principle, by generating a start command. This requires, on the one hand, the supply of fuel by means of the fuel supply means 18 and the corresponding supply of combustion air. Furthermore, the heating means 22 may be actuated in order to achieve intensified evaporation by heating the fuel. A predetermined period of time after the activation of the fuel supply means 18 and of the heating means 22 can then also activate, for example, the heating means 24 in order to subsequently ignite the mixture of air and fuel vapor that will now be present in the combustion chamber 16 in case of correct operation.

Since the various system areas that are actuated by the control device 26 are all users of electric energy, and since, moreover, it can be assumed, especially if the heater 12 is operated as a parking heater, that comparatively low outside temperatures prevail, the activation of the heater 12 always means a high load on the onboard power supply system, i.e., for example, a vehicle battery. To keep this load as low as possible, distinction is made according to the present invention as to how and on the basis of what condition the start command has been generated. If, for example, the start command has been generated by actuating one of the start buttons 30 or 36, it can be assumed that a driver is possibly already sitting in the vehicle or will put the vehicle into operation shortly. This means that comparatively little time is available for the parking heating operation, which in turn entails the condition that the heater 12 must be started as quickly as possible i.e. in a rapid start mode. The heating means 22 will then be operated in this case with a comparatively high heat output, e.g., the maximum possible heat output, in order to generate an ignitable fuel/air mixture in the combustion chamber 16 as quickly as possible.

If the start command has not been generated directly by the activity of a user, but by routine operation of the preset program and the determination that the start time agrees with the current time, it can be assumed that a normal operation is present, in which sufficient time is available for the heating means 12 to carry out a parking heating operation before the vehicle begins to be used i.e. slow start mode. The activation of the heating means 22 can then be done away with in this case or the heating means can be operated with a comparatively lower heat output only compared with the heat output with which it was operated in the above-described case. Even though the consequence of this will be that the duration of the start phase is prolonged, this can, however, be accepted, in principle, under these circumstances. It is decisive that the load on the onboard power supply system is also substantially lower in this mode of operation because of the lower heat output of the heating means 22 and the risk of draining the battery is thus reduced. It is possible in this mode of operation either to do away with the activation of the heating means 22 altogether or to only operate the heating means with a lower heat output than in the case in which the most rapid start possible is necessary. Since heating is brought about in this case in the area of the combustion chamber 16 solely by the heating means 24, i.e., for example, a glow type ignition pin, differentiation can also be made, in particular, depending on the ambient temperature, according to whether the heating means 22 is also activated during this phase and if so, how intensely. If the ambient temperatures are very low, it may be advantageous to operate the healing means 22 at least with a lower heat output because there is otherwise a risk that the heating provided by the glow type ignition element 24 will not be sufficient or this glow type ignition element 24 will have to be operated for a very long time, and a very large amount of energy will thus also have been consumed until ignition can take place.

If the heating system 10 is operated such that a program for the operation is preset by a user, a state is, in principle, also conceivable in which the user enters the vehicle, which has at first a comparatively low temperature, and the user then presets a program with an ignition time that will be reached shortly. This can also mean that the driver wishes to assume the operation shortly and it must therefore be ensured that the heater 12 will be put into operation as rapidly as possible.

To make it possible to ensure a suitable operation of the heater 12 during this phase as well, provisions may be made according to another aspect of the present invention for the time period between the entry of a program and the next start time to be compared with a minimum time. If it is determined that the minimum time is exceeded, and that, e.g., the heater 12 shall be put into operation again, for example, only in the next morning, normal operation is possible, i.e., the heater 12 can then be started in an energy saving mode with reduced activation or without activation of the heating means 22. If the duration is shorter than the minimum time, which may be, for example, in the range of a few minutes, it is ensured that the heater 12 can be started as rapidly as possible, for example, with the heating means 22 activated to the maximum possible extent, despite the fact that the start command is now actually generated based on the running of the preset program.

Consequently, depending on the operating behavior to be expected, i.e., on whether or not sufficient time is available for preheating, it can be ensured in the heating system 10 according to the present invention and during the operation of that system that the heater 12 can be operated in the most energy efficient manner possible, i.e., with the lowest possible load on the onboard power supply system. This is particularly advantageous because such heaters 12 are to be operated, in general, when onboard power supply systems are at least loaded more heavily due to the external climatic conditions.

It is pointed out that additional parameters, for example, the ambient temperature, can, of course, be used when presetting the heat output of the heating means 22 in order to set, for example, a temperature-dependent maximum heat output or minimum heat output, which maximum must not be exceeded and below which minimum the actual value must not drop, depending on the mode of operation, i.e., slow start or fast start. Furthermore, it is, of course, possible for the operating unit 28 to be part of the control device 26. Whether the start command is generated in one of the operating units 28 or 34 or the control device 26 itself is irrelevant for the present invention. It is significant that a differentiation is to be made according to the present invention depending on the manner in which such a start command has been generated and the condition on the basis of which such a start command has been generated, so that the measures proper can then be taken by a corresponding actuation by means of the control device 26.

While a specific embodiment of the invention has been shown and described in detail to illustrate the application of the principles of the invention, it will be understood that the invention may be embodied otherwise without departing from such principles.

What is claimed is:

1. A heating system for a vehicle, the heating system comprising:

a heater with a first electric heating device, which can be operated to ignite an air/fuel mixture present in a combustion chamber, and with a second electric heating device, which can be operated to support the evaporation of the fuel into the combustion chamber;

an actuating device for the heater, which said actuating device puts the heater into operation after a start command has been generated;

a first start command generating device, which can be actuated by a user to generate a start command;

a second start command generating device, which generates a start command according to an operating program;

wherein said actuating device operates the second electric heating device with a lower heat output after the generation of a start command by means of said second start command generating device than after the generation of a start command by means of said first start command generating device.

2. A heating system in accordance with claim 1, wherein at least one start time is defined in said operating program.

3. A heating system in accordance with claim 2, wherein the operating program can be entered by a user and when a duration between the entry of an operating program by a user and the start time defined in the operating program is shorter than a predetermined minimum time, said actuating device operates the second electric heating device at a higher heat output after the start command has been generated by means of the second start command generating device than when the duration is not shorter than the minimum time.

4. A heating system in accordance with claim 3, wherein when the duration is shorter than the minimum duration, said actuating device operates the second electric heating device with maximum heat output after the start command has been generated by means of the second start command generating device.

5. A heating system in accordance with claim 4, wherein after the start command has been generated by means of the second start command generating device, said actuating device does not put the second electric heating device into operation.

6. A process for operating a heating system in a vehicle, the process comprising:
  providing a heating system that comprises a heater with a first electric heating device, which can be operated to ignite an air/fuel mixture present in the combustion chamber, and with a second electric heating device, which can be operated to support the evaporation of the fuel into the combustion chamber, a first start command generating device, which can be actuated by a user to generate a start command, a second start command generating device, which generates a start command according to an operating program; and
  operating the second electric heating device with a higher heat output after a start command has been generated by means of the first start command generating device than after the generation of a start command by means of the second start command generating device.

7. A process in accordance with claim 6, wherein at least one start time is defined in said operating program.

8. A process in accordance with claim 7, wherein the operating program can be entered by a user and when a duration between the entry of an operating program by a user and the start time defined in the operating program is shorter than a predetermined minimum time, a control device operates the second electric heating device at a higher heat output after the start command has been generated by means of the second start command generating device than when the duration is not shorter than the minimum time.

9. A process in accordance with claim 8, wherein when the duration is shorter than the minimum duration, the control device operates the second electric heating device with maximum heat output after the start command has been generated by means of the second start command generating device.

10. A process in accordance with claim 9, wherein after the start command has been generated by means of the second start command generating device, the control device does not put the second electric heating device into operation.

11. A heating system comprising:
  a heater with a combustion chamber, and with ignition and evaporation heating devices, said ignition heating device igniting an air/fuel mixture present in said combustion chamber, said evaporation heating device evaporating fuel in said combustion chamber;
  a control device beginning operation of said heater in one of a rapid start mode and a slow start mode, said rapid start mode operating said evaporation heating device at a higher heat output than said slow start mode;
  an operating unit including a first starting switch operatable by a user of the heating system, said first starting switch sending a first type start signal to command said control device to operate in said rapid start mode, said operating unit including a second starting switch sending a second type start signal to command said control device to operate in said slow start mode.

12. A system in accordance with claim 11, wherein:
  said second starting switch includes a program generating said second type start signal depending on the presence of a predetermined condition.

13. A heating system in accordance with claim 12, wherein:
  said program determines a start time for the heater;
  said program can be entered by the user;
  said operating unit determines duration between a time of entry of said program and a start time of said program, when said duration is shorter than a predetermined minimum time, said operating unit generates said first type start signal to command said control device to operate in said rapid start mode.

14. A heating system in accordance with claim 13, wherein:
  when said duration is longer than said minimum duration, said operating unit generates said second type start signal to command said control device to operate in said slow start mode.

15. A beating system in accordance with claim 14, wherein:
  said slow start mode does not operate said evaporation heating device.

16. A heating system in accordance with claim 11, wherein:
  said first starting switch and said second starting switch generate their respective first and second type start signals separately and independently.

* * * * *